(12) United States Patent
Dorum

(10) Patent No.: US 10,209,082 B2
(45) Date of Patent: Feb. 19, 2019

(54) METHOD AND APPARATUS FOR MATCHING PROBE POINTS TO ROAD SEGMENTS UTILIZING A TRAJECTORY IDENTIFIER

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/147,406

(22) Filed: May 5, 2016

(65) Prior Publication Data

US 2017/0322035 A1 Nov. 9, 2017

(51) Int. Cl.
G01C 21/30 (2006.01)
G08G 1/01 (2006.01)
G01C 21/32 (2006.01)

(52) U.S. Cl.
CPC ............. *G01C 21/30* (2013.01); *G01C 21/32* (2013.01); *G08G 1/0112* (2013.01)

(58) Field of Classification Search
USPC ........................................................ 701/446
See application file for complete search history.

(56) References Cited

U.S. PATENT DOCUMENTS

| | | |
|---|---|---|
| 5,852,791 A | 12/1998 | Sato et al. |
| 6,108,603 A | 8/2000 | Karunanidhi |
| 2011/0208426 A1 | 8/2011 | Zheng et al. |

(Continued)

FOREIGN PATENT DOCUMENTS

| | | |
|---|---|---|
| CN | 104111073 | 10/2014 |
| EP | 2278576 | 1/2011 |
| WO | WO 2015/078238 | 6/2015 |

OTHER PUBLICATIONS

Pereira, F. et al., *An Off-line Map-matching Algorithm for Incomplete Map Databases*, European Transport Research Review, vol. 1, Issue 3, (Oct. 2009) Retrieved from the internet: <URL: http://link.springer.com/article/10.1007/s12544-009-0013-6> (dated Sep. 11, 2009) 43 pages.

(Continued)

*Primary Examiner* — Tyler D Paige
(74) *Attorney, Agent, or Firm* — Alston & Bird LLP

(57) ABSTRACT

A method, apparatus and computer program product are provided to match probe points to road segments utilizing a trajectory identifier, thereby increasing the accuracy with which probe points, such as probe points in ambiguous locations, are matched to road segments. For a probe point having a respective trajectory identifier (ID) and associated with an ambiguous link tuple, the method identifies each probe point having the respective trajectory ID that is unambiguously matched to first or second branches. The method separately determines a number of probe points having the respective trajectory ID that are unambiguously matched to the first and second branches. The method matches the probe point having the respective trajectory ID and associated with the ambiguous link tuple to either the first branch or the second branch based upon the number of probe points having the respective trajectory ID that are unambiguously matched to the first and second branches.

20 Claims, 6 Drawing Sheets
(3 of 6 Drawing Sheet(s) Filed in Color)

(56) References Cited

U.S. PATENT DOCUMENTS

2012/0271542 A1* 10/2012 Arcot ................ G01C 21/3492
                                                        701/411
2013/0131980 A1   5/2013 Ginsberg
2014/0278055 A1   9/2014 Wang et al.
2017/0177933 A1*  6/2017 Mittal ................ G06K 9/00476

OTHER PUBLICATIONS

Quaddus, M. et al., *Current map-matching algorithms for transport applications: State-of-the art and future research directions*, Elsevier, Transportation Research Part C: Emerging Technologies, vol. 15, Issue 5, (Oct. 2007) 312-328.
U.S. Appl. No. 14/752,159, filed Jun. 26, 2015, In re: Dorum entitled *Map-Centric Map Matching Method and Apparatus*.
Wei, H. et al., *Fast Viterbi Map Matching with Tunable Weight Functions*, ACM Sigspatial GIS, (Nov. 6-9, 2012) 4 pages.
International Search Report and Written Opinion for Application No. PCT/EP2017/060562 dated Jul. 26, 2017.

* cited by examiner

METHOD AND APPARATUS FOR MATCHING PROBE POINTS TO ROAD SEGMENTS UTILIZING A TRAJECTORY IDENTIFIER

TECHNOLOGICAL FIELD

An example embodiment is directed generally to the matching of probe points to road segments as represented by a map and, more particularly, to the matching of probe points to road segments utilizing a trajectory identifier.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle. Map matching for real time applications may only utilize the path of probe points up to the most recent probe point since those are the only probe points that are known. Alternatively, map matching may rely upon post-processing, such as in instances in which the probe points captured by a plurality of GPS systems or navigation systems are matched to the road segments represented by a map for traffic estimation or other purposes. The accuracy of the map matching provided by post-processing may be improved relative to the map matching for real time applications since probe points captured subsequent in time to the probe point currently being processed are also known and may be referenced during the post-processing.

A variety of probe-centric map matching techniques have been developed. These map matching techniques include map matching techniques that utilize geometric analysis including point-to-point analysis, point-to-curve analysis and trajectory techniques. Other map matching techniques utilize a topological analysis of the road network to improve accuracy and performance. Some map matching techniques utilize probabilistic map-matching algorithms. The probabilistic map-matching algorithms attempt to identify the most probable road segment in some confidence region about a respective probe point. Additionally or alternatively, probabilistic map-matching algorithms may attempt to identify the most probable path in addition to the most probable road segment. The probabilistic map-matching algorithms may include, for example, Viterbi and hidden Markov model techniques. Further, map-matching techniques may include other types of map-matching algorithms including those that utilize Kalman and extended Kalman based techniques and those that utilize particle filters.

Whether performed in real time or as a post-processing technique, map matching has been a probe-centric process in which each probe point is analyzed to identify the closest road segment and the projection of the probe point onto the closest road segment. In order to identify the closest road segment, a separate spatial search is generally conducted for each probe point; even in instances in which a probe point is spaced a substantial distance from any road segment. Thus, the number of spatial searches to be conducted is generally proportional to the number of probe points.

Spatial searches are computationally expensive. For example, probe-centric map matching techniques for large probe data sets, such as millions of probe points, can incur substantial execution time and costs since the number of spatial searches is proportional to the number of probe points. Thus, map matching and, in particular, the spatial searches for each of the probe points may become a limiting factor at least for real time applications.

In an effort to perform map matching more quickly and efficiently, a map-centric map matching technique has been developed as described by U.S. patent application Ser. No. 14/752,159 entitled Map-Centric Map Matching Method and Apparatus and filed Jun. 26, 2015, the entire contents of which are incorporated herein by reference. The map-centric map matching technique may, in many instances, conduct fewer spatial searches since the spatial searches are no longer proportional in number to the number of probe points and are, instead, based upon the length of the road segments of the map to which the probe points are to be matched. As a result, the map-centric map matching technique may map match the probe points in a more efficient manner.

However, map-centric map matching techniques may be unable to map match probe points to respective road segments with a desired level of confidence at ambiguous locations within a road network. As shown in FIG. 1, ambiguous locations at which probe points cannot be map matched to respective road segments with a sufficient level of confidence by map-centric map matching techniques may include crossing roads, both crossing roads at grade and crossing roads not at grade, for which probe points have the same or similar headings as shown at 10 in FIG. 1, adjacent or parallel roads for which the probe points have the same or similar probe headings as shown at 12 in FIG. 1, and ramps or bifurcations in which a roadway splits or merges as shown at 14 in FIG. 1. At these ambiguous locations along the road network, the probe points may be incorrectly map matched to the wrong road segment. Even if map matched to the correct road segment, the confidence value associated with the map matched probe point may be lower than is desirable. Although the results for the map matching of probe points at ambiguous locations may be improved by the utilization of probabilistic map matching, the probe points may still not be map matched to the correct road segments with sufficient accuracy and/or with a desired level of confidence.

BRIEF SUMMARY

A method, apparatus and computer program product are provided in accordance with an example embodiment in order to match probe points to road segments utilizing a trajectory identifier. As such, probe points may be more accurately matched to road segments with a greater level of confidence, even in ambiguous locations within a road network, such as at or near crossing roads, adjacent or parallel roads, or ramps and bifurcations. In an example embodiment, the matching of probe points to road segments utilizing a trajectory identifier may be employed in conjunction with a map-centric map matching technique in order to map match the probe points quickly, efficiently and accurately, even at ambiguous locations within a road network. In this regard, following the matching of many probe points to respective road segments utilizing a map-centric map matching technique, the probe points at ambiguous locations within the road network may then be accurately mapped to respective road segments in an efficient matter by analyzing the probe points already matched to a limited number of the road segments that are proximate to the ambiguous locations.

In an example embodiment, a method is provided that includes identifying, for a probe point having a respective trajectory identifier (ID) and associated with an ambiguous link tuple, each probe point having the respective trajectory ID that is unambiguously matched to one of a first branch or a second branch that extend away from the ambiguous link tuple. The method also includes separately determining a number of probe points having the respective trajectory ID that are unambiguously matched to the first branch and that are unambiguously matched to the second branch. The method further includes matching the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

The probe point may be matched in accordance with an example embodiment by matching the probe point having the respective trajectory ID that was associated with the ambiguous link tuple to the respective one of the first branch or the second branch for which the number of probe points having the respective trajectory ID unambiguously matched thereto exceeds the number of probe points having the respective trajectory ID that are unambiguously matched to the other one of the first branch or the second branch by at least a predefined amount. The method of this example embodiment may also include includes causing the probe point having the respective trajectory ID to remain associated with the ambiguous link tuple in an instance in which the number of probe points having the respective trajectory ID that are unambiguously matched to the first branch and that are unambiguously matched to the second branch differ by less than the predefined amount.

A plurality of probe points having respective trajectory IDs may be associated with the ambiguous link tuple. In this example embodiment, the method may identify each probe point having any one of the respective trajectory IDs of the probe points associated with the ambiguous link tuple that are unambiguously matched to one of the first branch or the second branch during a single traversal of the first branch and the second branch. The method of an example embodiment also includes determining a confidence value associated with the match of the probe point having the respective trajectory ID to a respective one of the first branch or the second branch based upon a ratio of a number of probe points having the respective trajectory ID that are unambiguously matched to the first branch and to the second branch.

The method of an example embodiment also includes map matching a plurality of probe points to respective links. In this example embodiment, the map matching includes identifying the probe point associated with the ambiguous link tuple. The method of an example embodiment identifies each probe point having the respective trajectory ID that is unambiguously matched one of the first and second branches along the same predefined length of the first and second branches. The first branch may split into at least two sub-branches. In this instance, the method identifies each probe point having the respective trajectory ID that is unambiguously matched to the first branch by identifying each probe point having the respective trajectory ID that is unambiguously matched to one of the at least two sub-branches into which the first branch splits.

In another example embodiment, an apparatus is provided that includes at least one processor and at least one memory storing computer program code with the at least one memory and the stored computer program code being configured, with the at least one processor, to cause the apparatus to at least identify, for a probe point having a respective trajectory identifier (ID) and associated with an ambiguous link tuple, each probe point having the respective trajectory ID that is unambiguously matched to one of a first branch or a second branch that extend away from the ambiguous link tuple. The at least one memory and the stored computer program code are configured, with the at least one processor, to cause the apparatus of this example embodiment to separately determine the number of probe points having the respective trajectory ID that are unambiguously matched to the first branch and that are unambiguously matched to the second branch. The at least one memory and the stored computer program code are configured, with the at least one processor, to cause the apparatus of this example embodiment to match the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

The probe point may be matched in accordance with an example embodiment by matching the probe point having the respective trajectory ID that was associated with the ambiguous link tuple to the respective one of the first branch or the second branch for which the number of probe points having the respective trajectory ID unambiguously matched thereto exceeds the number of probe points having the respective trajectory ID that are unambiguously matched to the other one of the first branch or the second branch by at least a predefined amount. The at least one memory and the stored computer program code are configured, with the at least one processor, to cause the apparatus of this example embodiment to cause the probe point having the respective trajectory ID to remain associated with the ambiguous link tuple in an instance in which the number of probe points having the respective trajectory ID that are unambiguously matched to the first branch and that are unambiguously matched to the second branch differ by less than the predefined amount.

A plurality of probe points having the respective trajectory ID may be associated with the ambiguous link tuple. In this instance, the at least one memory and the stored computer program code are configured, with the at least one processor, to cause the apparatus of an example embodiment to identify each probe point having any one of the respective trajectory IDs of the probe points associated with the ambiguous link tuple that are unambiguously matched to one of the first branch or the second branch during a single traversal of the first branch and the second branch. The at least one memory and the stored computer program code are further configured, with the at least one processor, to cause the apparatus of an example embodiment to determine the confidence value associated with the match of the probe point having the respective trajectory ID to a respective one of the first branch or the second branch based upon a ratio of the number of probe points having the respective trajectory ID that are unambiguously matched to the first branch and to the second branch. The at least one memory and the stored computer program code are further configured, with the at least one processor, to cause the apparatus of an example embodiment to map match a plurality of probe points to respective links. In this example embodiment, the at least one memory and the stored computer program code are also configured, with the at least one processor, to cause the apparatus to identify, by the map matching, the probe point associated with the ambiguous link tuple.

In a further example embodiment, a computer program product is provided that includes at least one non-transitory computer-readable storage medium having computer-readable program instructions stored therein with the computer-readable program instructions including program instructions configured to identify, for a probe point having a respective trajectory identifier (ID) and associated with an ambiguous link tuple, each probe point having the respective trajectory ID that is unambiguously matched to one of a first branch or a second branch that extend away from the ambiguous link tuple. The computer-readable program instructions also include program instructions configured to separately determine a number of probe points having the respective trajectory ID that are unambiguously matched to the first branch and that are unambiguously matched to the second branch. The computer-readable program instructions further include program instructions configured to match the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

The probe point may be matched in accordance with an example embodiment by matching the probe point having the respective trajectory ID that was associated with the ambiguous link tuple to the respective one of the first branch or the second branch for which the number of probe points having the respective trajectory ID unambiguously matched thereto exceeds the number of probe points having the respective trajectory ID that are unambiguously matched to the other one of the first branch or the second branch by at least a predefined amount. The computer-readable program instructions further include program instructions configured to cause the probe point having the respective trajectory ID to remain associated with the ambiguous link tuple in an instance in which the number of probe points having the respective trajectory ID that are unambiguously matched to the first branch and that are unambiguously matched to the second branch differ by less than the predefined amount.

A plurality of probe points having respective trajectory IDs may be associated with the ambiguous link tuple. In this instance, the program instructions configured to identify each probe point may include program instructions configured to identify each probe point having any one of the respective trajectory IDs of the probe points associated with the ambiguous link tuple that are unambiguously matched to one of the first branch or the second branch during a single traversal of the first branch and the second branch. The computer-readable program instructions of an example embodiment also include program instructions configured to determine a confidence value associated with the match of the probe point having the respective trajectory ID to a respective one of the first branch or the second branch based upon a ratio of a number of probe points having the respective trajectory ID that are unambiguously matched to the first branch and to the second branch. The computer-readable program instructions of an example embodiment also include program instructions configured to map match a plurality of probe points to respective links. In this example embodiment, the program instructions configured to map match also include program instructions configured to identify the probe point associated with the ambiguous link tuple.

In yet another example embodiment, an apparatus is provided that includes means for identifying, for a probe point having a respective trajectory identifier (ID) and associated with an ambiguous link tuple, each probe point having the respective trajectory ID that is unambiguously matched to one of a first branch or a second branch that extend away from the ambiguous link tuple. The apparatus of this example embodiment also includes means for separately determining a number of probe points having the respective trajectory ID that are unambiguously matched to the first branch and that are unambiguously matched to the second branch. The apparatus of this example embodiment further includes means for matching the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

BRIEF DESCRIPTION OF THE DRAWINGS

The patent application file contains at least one drawing executed in color. Copies of this patent application with color drawing(s) will be provided by the Office upon request and payment of the necessary fee.

Figure 1:
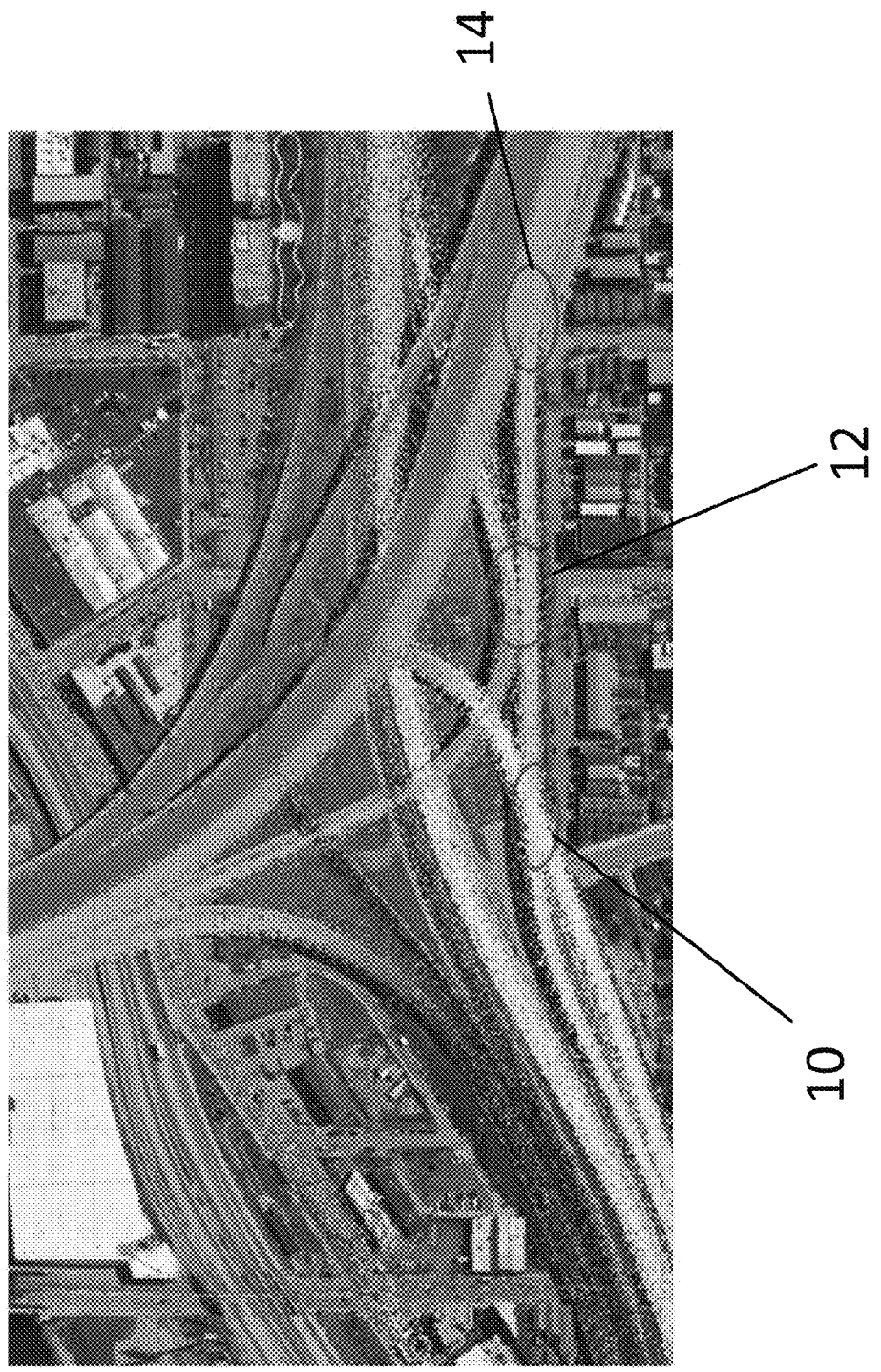
Figure 2:
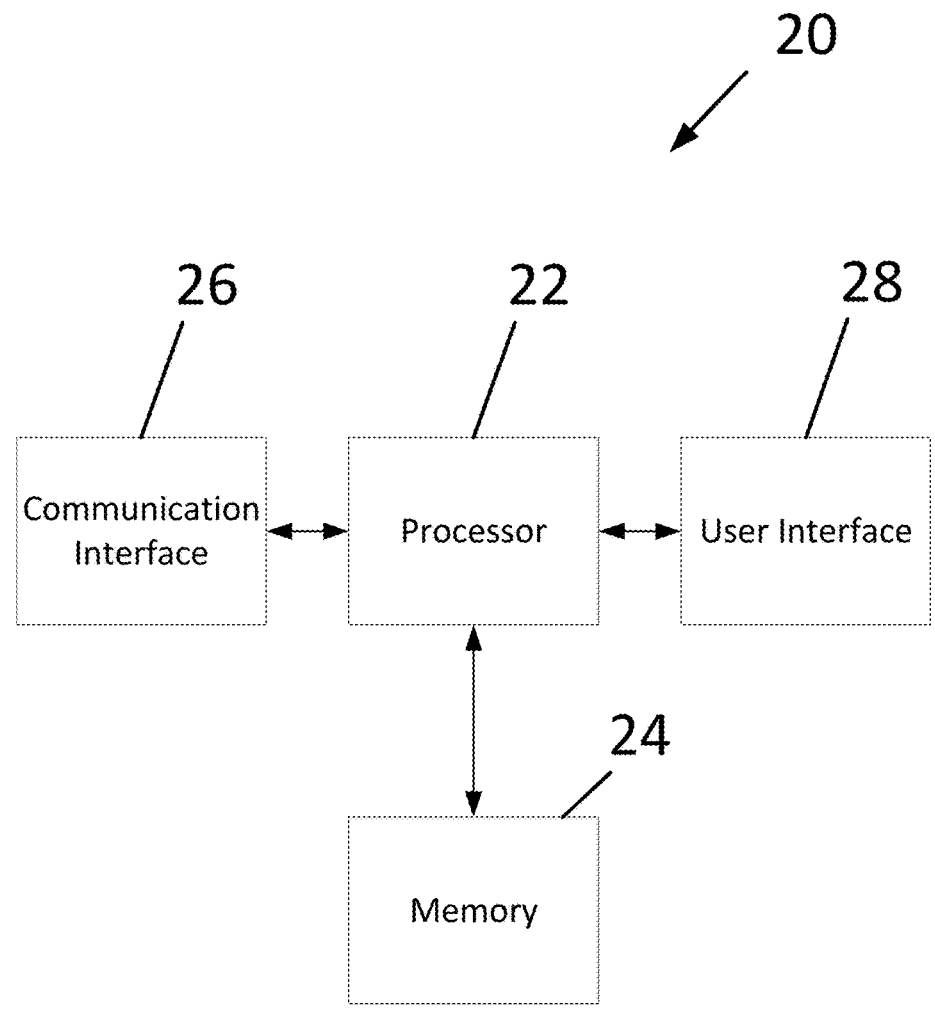
Figure 3:
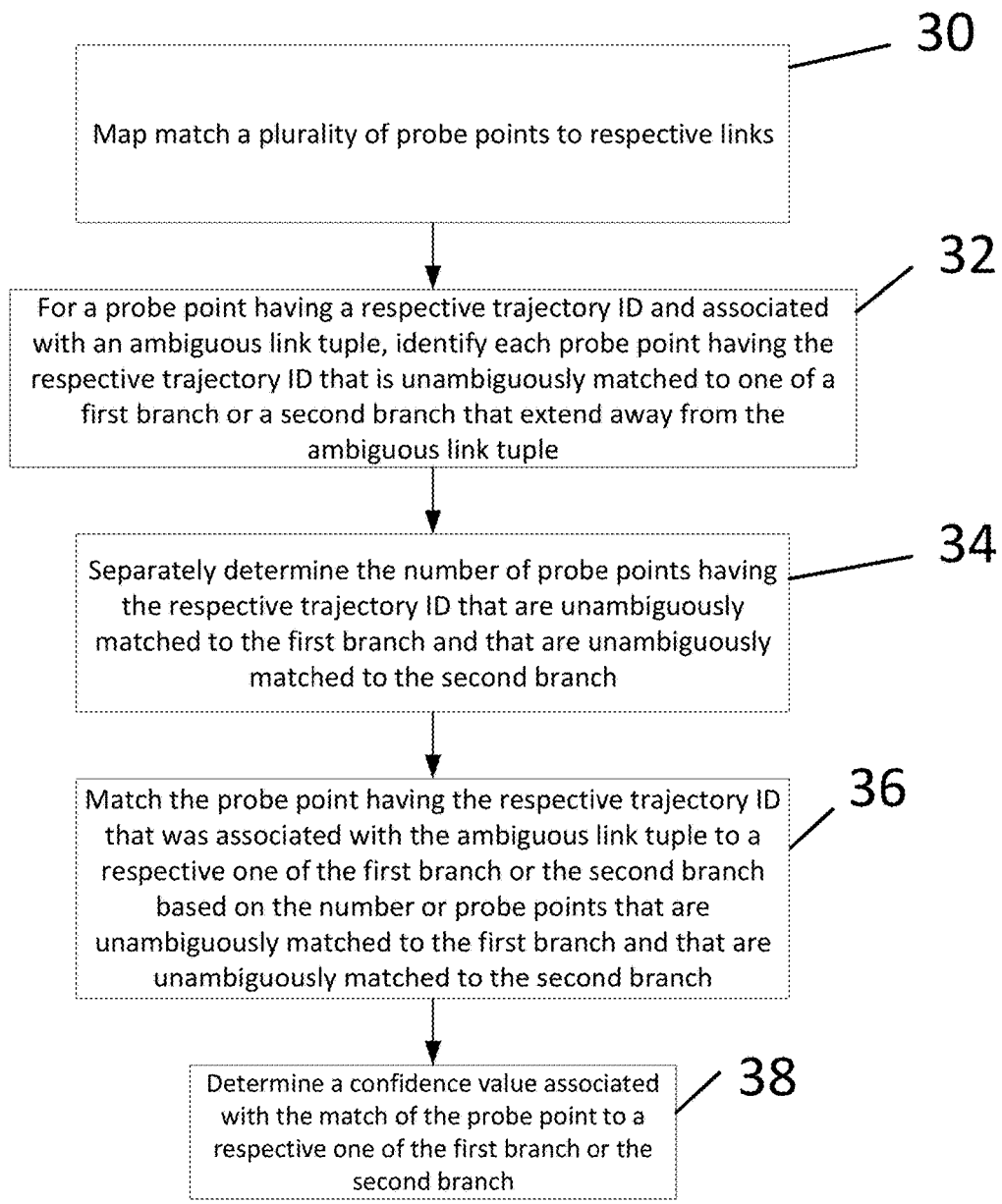
Figure 4:
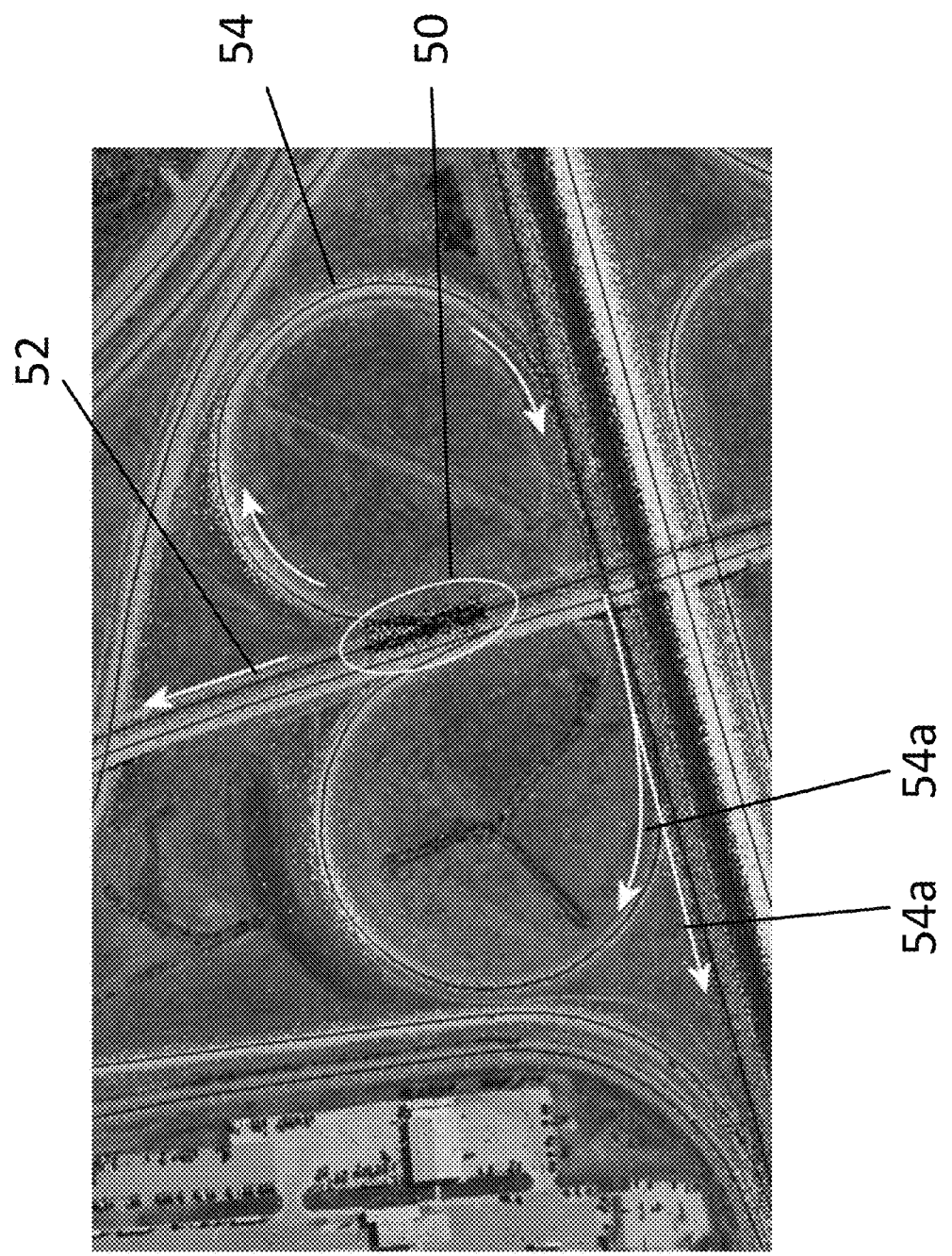
Figure 5:
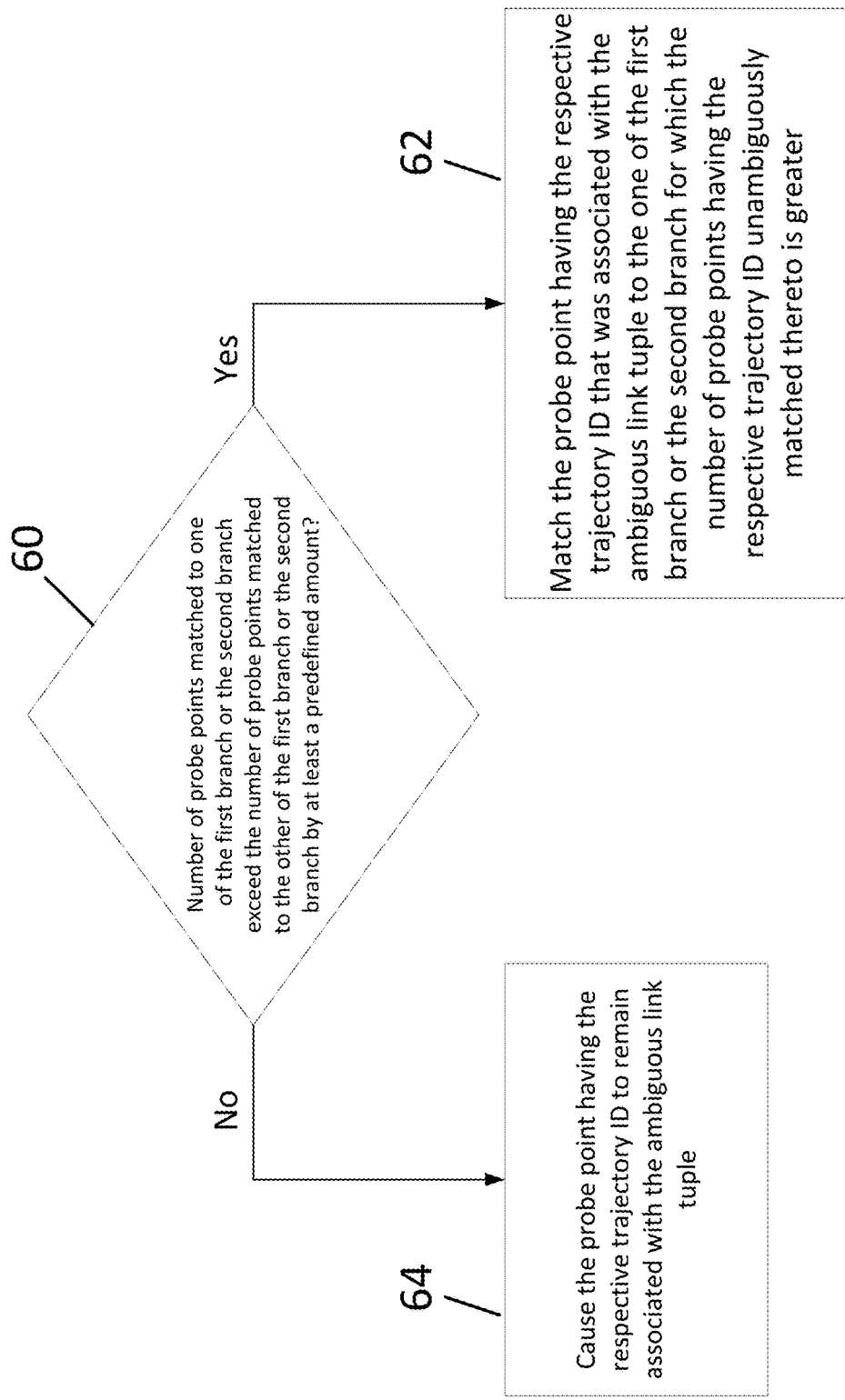
Figure 6:
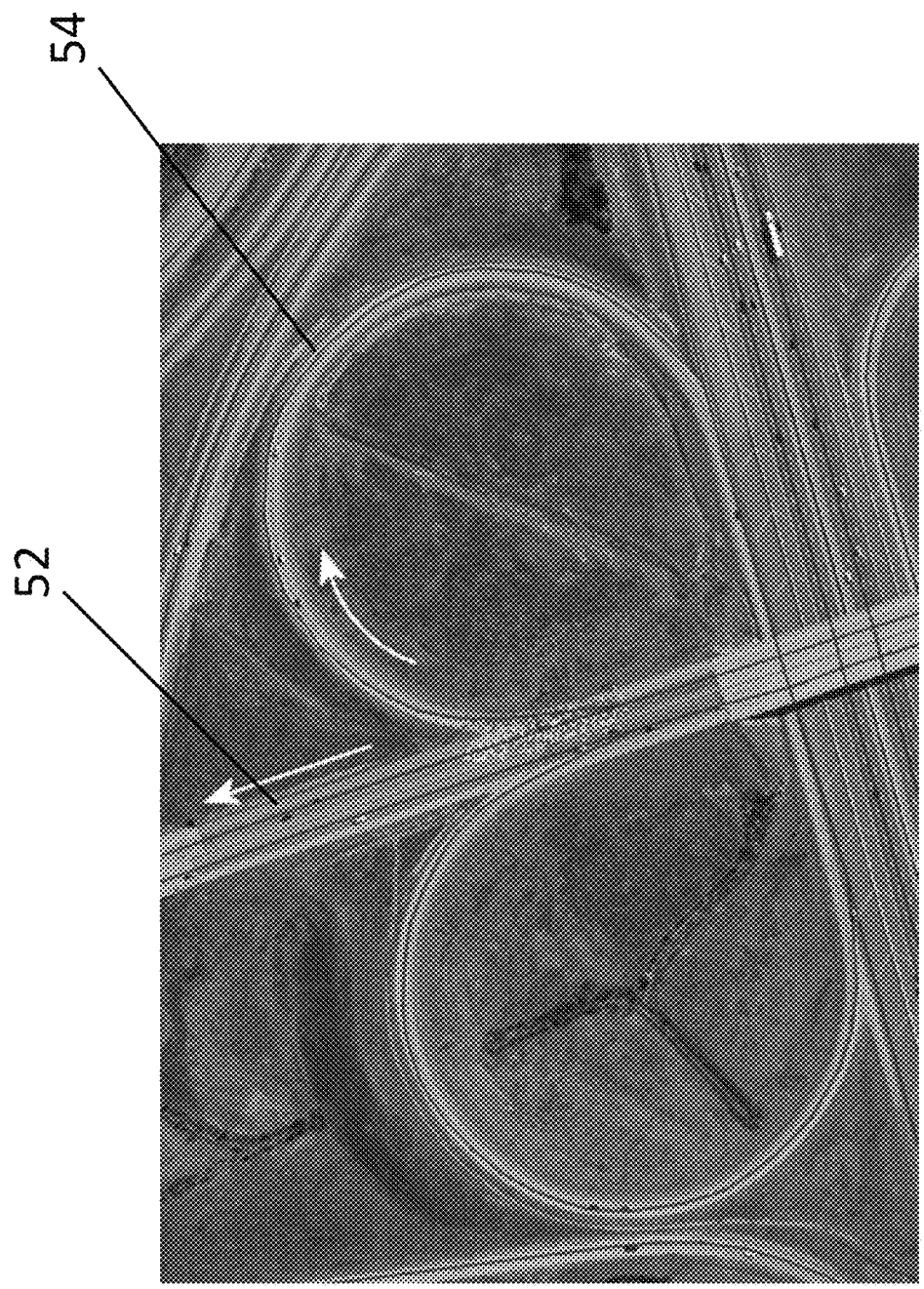

Having thus described certain example embodiments of the present disclosure in general terms, reference will hereinafter be made to the accompanying drawings, which are not necessarily drawn to scale, and wherein:

FIG. 1 illustrates three ambiguous locations within a road network;

FIG. 2 is a block diagram of an apparatus that may be specifically configured in accordance with an example embodiment of the present invention;

FIG. 3 is a flowchart illustrating the operations performed, such as by the apparatus of FIG. 2, in accordance with an example embodiment of the present invention;

FIG. 4 depicts first and second branches that extend outward from an ambiguous link tuple and along which trajectory identifiers are identified in order to match probe points associated with the ambiguous link tuple in accordance with an example embodiment of the present invention;

FIG. 5 is a flowchart illustrating the operations performed, such as by the apparatus of FIG. 2, in order to match the probe point to a respective one of the first branch or the second branch in accordance with an example embodiment of the present invention; and FIG. 6 depicts the probe points associated with the ambiguous link tuple of FIG. 4 that have been matched to a respective one of the first branch or the second branch in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided to match probe points to road segments utilizing a trajectory identifier, thereby increasing the accuracy and the confidence with which probe points, such as probe points in ambiguous locations within a road network, e.g., at or near crossing roads, adjacent or parallel roads, or ramps and bifurcations, are matched to road segments. In an example embodiment, the matching of probe points to road segments utilizing a trajectory identifier may be employed in conjunction with a map-centric map matching technique such that the map-centric matching technique may efficiently match many probe points to respective road segments with the probe points that are at ambiguous locations within the road network and that cannot be accurately map matched then being matched utilizing the associated trajectory identifiers, such as during a single traversal of a limited number of the road segments that are proximate to the ambiguous locations.

The apparatus of an example embodiment may be embodied by a variety of computing devices including, for example, such as a navigation system, an advanced driver assistance system (ADAS), a GPS system or the like. Additionally or alternatively, the apparatus may be embodied in other types of computing devices, such as a server, a personal computer, a computer workstation, a laptop computer, a plurality of networked computing devices or the like, that are configured to analyze probe points, such as for traffic estimation or other purposes. In this regard, FIG. 2 depicts the apparatus 20 of an example embodiment that may be embodied by various computing devices including those identified above. As shown, the apparatus of an example embodiment may include, may be associated with or may otherwise be in communication with a processor 22 and a memory device 24 and optionally a communication interface 26 and/or a user interface 28.

In some embodiments, the processor 22 (and/or co-processors or any other processing circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment also optionally includes a communication interface 26 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 2, the apparatus 20 may also optionally include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24 and/or the like).

In order to provide for matching of probe data as represented by a plurality of probe points to respective road segments, reference is now made to FIG. 3 in which the operations performed, such as by the apparatus 20 of FIG. 2, are depicted. The method, apparatus and computer program product of an example embodiment are configured to match the probe points associated with an ambiguous link tuple to respective road segments. As described below, the matching of the probe points associated with the ambiguous link tuple may be performed in an efficient manner, such as based upon a single traversal of the road segments that extend away from the ambiguous link tuple.

An ambiguous link tuple includes two or more links of a road network that are located relative to one another such that it is impossible, for a respective probe point, to determine with sufficient confidence with which link of the ambiguous link tuple the probe point is associated. For example, an ambiguous link tuple may be defined by two or more links of adjacent road segments that have the same or similar headings. These road segments that include links forming an ambiguous link tuple may include crossing roads for which probe points that are associated therewith have the same or similar headings, adjacent or parallel roads for which probe points that are associated therewith have the same or similar headings, ramps and bifurcations. As further result of the road segments that constitute the ambiguous link tuple being positioned relatively close to one another and oriented such that vehicles traveling along the respective road segments have the same or similar headings, a probe point may be associated, such as by a map-centric map matching technique, with the ambiguous link tuple such as by associating the probe point with two or more links of the ambiguous link tuple, but the probe point cannot be associated with an individual one of the links of the ambiguous link tuple with sufficient confidence.

An ambiguous link tuple and the probe points associated therewith may be determined in various manners. In an example embodiment and as shown in block 30 of FIG. 3, the apparatus 20 includes means, such as the processor 22 or the like, for map matching a plurality of probe points to respective links. Although the probe points may be map matched to respective links of a road network in various manners, one technique for map matching a plurality of probe points to respective links in an efficient manner is described by U.S. patent application Ser. No. 14/752,159 entitled Map-Centric Map Matching Method and Apparatus and filed Jun. 26, 2015, the entire contents of which are incorporated herein by reference. During the map matching process, the apparatus will also include means, such as the processor or the like, for identifying one or more probe points associated with an ambiguous link tuple. In this regard, the apparatus, such as the processor, is configured to identify probe points that map match to more than one link by satisfying the matching parameters for two or more links. Although various matching parameters may be utilized to associate probe points with a respective link, examples of the matching parameters that may be utilized include the maximum distance to a road segment, the heading tolerance with respect to the road heading, the minimum and maximum speed associated with the probe point and maximum and/or minimum thresholds associated with the confidence value with which a probe point is matched to a respective link.

With respect to some probe points, multiple links may satisfy all of the matching parameters such that the result of the map matching technique is ambiguous. While the probe points for which the result of the map matching is ambiguous may be associated with one of the links based upon a predefined criteria, such as by associating a probe point with the road segment that is closest to the probe point, the road segment that has a heading that most closely matches the heading associated with the probe point or the road segment for which the match has the greatest confidence value, the apparatus 20, such as the processor 22, of an example embodiment identifies the probe point as being ambiguous and identifies the two or more links to which the probe point may be matched, that is, that two or more links for which the matching parameters are satisfied relative to the probe point in question, to be the ambiguous link tuple.

Once the ambiguous link tuples and the probe points associated therewith have been identified, the method, apparatus and computer program product of an example embodiment analyze the probe points that are associated with ambiguous link tuples in an efficient manner in order to identify the individual links with which the probe points are associated. In this regard, for a probe point having a respective trajectory ID and being associated with an ambiguous link tuple, the apparatus 20 includes means, such as the processor 22 or the like, for identifying each probe point having the respective trajectory ID that is unambiguously matched to one of a first branch or a second branch that extend away from the ambiguous link tuple. See block 32 of FIG. 3. In this regard, each probe point is associated with a plurality of parameters including, for example, location, speed, heading, etc. Each probe point is also generally associated with a trajectory ID. The trajectory ID may uniquely identify the probe points collected by a respective device, such as the navigation system for a vehicle, at least for a period of time. Thus, each probe point collected by the same device for at least a period of time will have the same probe trajectory ID, which differs from the probe trajectory IDs associated with the probe points collected by other devices during the same period of time.

In order to identify each probe point having the respective trajectory ID that is unambiguously matched to a first branch or that is unambiguously matched to a second branch that extend away from the ambiguous link tuple, the apparatus 20, such as the processor 22, identifies each of a plurality of branches that extend away from the ambiguous link tuple. While at least two branches, namely, a first branch and a second branch, extend away from the ambiguous link tuple, three or more branches may extend away from the ambiguous link tuple in some embodiments. By way of example, FIG. 4 depicts a road network including an ambiguous link tuple 50 formed by a highway having a ramp that separates from the highway. In this example, a plurality of probe points are associated by map matching to the various road segments of the road network. However, for those probe points within the ambiguous link tuple, the probe points satisfy the matching parameters for each of the links of the ambiguous link tuple. In this example, the continuation of the highway beyond the ambiguous link tuple forms a first branch 52 and the extension of the ramp beyond the ambiguous link tuple forms the second branch 54. Thus, the apparatus, such as the processor, identifies each probe point along the first branch and along the second branch, in the direction of the bifurcating branches with respect to the ambiguous probe region, that has the same trajectory ID as a probe point within the ambiguous probe region.

In the illustrated embodiment in which the bifurcation is an off-ramp, probe points are identified along the first and second branches in the downstream direction with respect to traffic flow relative to the ambiguous probe region. In general for ramps and bifurcations, the direction in which the first and second branches are analyzed in order to identify probe points having the same trajectory ID is irrespective to the traffic flow and depends on whether the roads spit or merge. In this regard, the direction in which the first and second branches are analyzed goes in the direction of the splitting branches of the bifurcating roads, e.g., the direction in which the first and second branches are analyzed follows the traffic flow for splitting roads, but backtracks in a direction opposite of the traffic flow for merged roads. For crossing or adjacent roads, the first and second branches are analyzed in both directions of traffic flow from the ambiguous probe region.

As this example demonstrates, a plurality of probe points having respective trajectory IDs may be associated with an ambiguous link tuple. At least some of the probe points associated with an ambiguous link tuple generally have different trajectory IDs as a result of having been collected as different vehicles drove along the road segments that define the links of the ambiguous link tuple. In order to efficiently match the probe points associated with an ambiguous link tuple with respective links of the ambiguous link tuple, the apparatus 20 of an example embodiment includes means, such as the processor 22 or the like, for identifying each probe point having any one of the respective trajectory IDs of the probe points associated with the ambiguous link tuple that is unambiguously matched to one of the first branch or the second branch during a single traversal of the first branch and a single traversal of the second branch. Thus, the apparatus, such as the processor, of this example embodiment identifies all of the probe points along the first branch having a trajectory ID that matches any one of the trajectory IDs of the probe points associated with the ambiguous link tuple during a single pass along the first branch. Similarly, the apparatus, such as the processor, of this example embodiment identifies all of the probe points along the second branch having a trajectory ID that matches any one of the trajectory IDs of the probe points associated with the ambiguous link tuple during a single pass along the second branch. Thus, the apparatus, such as the processor, of an example embodiment evaluates the probe points and the respective trajectory IDs along the first branch and along the second branch only a single time with respect to all of the probe points associated with the ambiguous link region, thereby increasing the efficiency with which the probe points are matched to a respective link.

In regards to identifying each probe point having the respective trajectory ID that is unambiguously matched to one of the first branch or the second branch, the apparatus 20, such as the processor 22, is configured to identify each probe point having the respective trajectory ID that is unambiguously matched to one of the first and second branches along the same predefined length of the first and second branches, as measured in a downstream direction (relative to traffic flow since it is an off ramp) from the location of the ambiguous link tuple. Additionally, in an embodiment in which one or both of the branches splits into at least two sub-branches, the apparatus, such as the processor, is configured in accordance with an example embodiment to identify each probe point having the respective trajectory ID that is unambiguously matched to the respective branch that has split into two or more sub-branches by identifying each probe point having the respective trajectory ID that is unambiguously matched to either one or both of the at least two sub-branches, at least until the predefined length of the branch and its two or more sub-branches has been traversed and the probe points associated therewith have been evaluated. With respect to the example depicted in FIG. 4, the second branch 54 defined by the ramp splits into two sub-branches 54a. As such, the apparatus, such as a processor, considers the probe points along each of the two sub-branches, at least until the probe points along the predefined length of the second branch and its sub-branches has been evaluated, in order to identify probe points having the same respective trajectory IDs as the probe points associated with the ambiguous link tuple.

As shown in block 34 of FIG. 3, the apparatus 20 of an example embodiment also includes means, such as the processor 22 or the like, for separately determining the number of probe points having the respective trajectory ID (of a probe point associated with the ambiguous link tuple) that are unambiguously matched to the first branch and that are unambiguously matched to the second branch. Thus, for a probe point having a respective trajectory ID that is associated with the ambiguous link tuple, the apparatus, such as the processor, determines the number of probe points having the same respective trajectory ID that are unambiguously matched to the first branch. Additionally, the apparatus, such as the processor, determines the number of probe points having the same respective trajectory ID that are unambiguously matched to the second branch. In an embodiment in which multiple probe points with different trajectory IDs are associated with the ambiguous link tuple, the apparatus, such as the processor, of an example embodiment is configured to separately determine the number of probe points having the respective trajectory ID that are unambiguously matched to the first branch and that are unambiguously matched to the second branch for each of the probe points having a different trajectory ID that is associated with the ambiguous link tuple.

As shown in block 36 of FIG. 3, the apparatus 20 also includes means, such as the processor 22 or the like, for matching the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch. As shown in FIG. 5, the apparatus, such as the processor, of an example embodiment is configured to match the probe point having the respective trajectory ID that was associated with the ambiguous link tuple to the one of the first branch or the second branch that has the greater number of probe points having the respective trajectory ID that are unambiguously matched thereto, at least in an instance in which the number of probe points having the respective trajectory ID that are unambiguously matched the one branch exceeds the number of probe points having the respective trajectory ID that are unambiguously matched the other branch by at least a predefined amount.

As shown in block 60 of FIG. 5, for example, the apparatus 20 of an example embodiment includes means, such as the processor 22 or the like, for determining whether the number of probe points matched to one of the first branch or the second branch exceeds the number of probe points matched to the other of the first branch or the second branch by at least a predefined amount. In an instance in which the number of probe points matched to one of the first and second branches does exceed the number of probe points matched to the other of the first and second branches by at least the predefined amount, the apparatus of this example embodiment includes means, such as the processor or the like, for matching the probe point having the respective trajectory ID that was associated with the ambiguous link tuple to the one of the first branch or the second branch for which the number of probe points having the respective trajectory ID unambiguously matched thereto is greater. See block 62. However, in an instance in which the number of probe points matched to one of the first and second branches differs from the number of probe points matched to the other of the first and second branches by less than the predefined amount, the apparatus of this example embodiment includes means, such as the processor or the like, for causing the probe point having the respective trajectory ID to remain associated with the ambiguous link tuple since the probe point cannot be associated with any particular one of the links of the ambiguous link tuple with sufficient confidence in the resulting accuracy of the matching. See block 64. This matching process may be performed for each of the probe points associated with the ambiguous link tuple, thereby eliminating or at least reducing the number of probe points associated with the ambiguous link tuple.

The predefined amount may be set to a variety of different values. In one embodiment, however, the predefined amount is 1 and the apparatus, such as the processor, is configured to determine whether the same number of probe points are matched to both the first and second branches. In this example embodiment, in an instance in which a different number of probe points having the same respective trajectory ID are unambiguously matched to the first branch and are unambiguously matched to the second branch, the apparatus 20, such as the processor 22, is configured to match the probe point having the respective trajectory ID that was associated with the ambiguous link tuple to the one of the first branch or the second branch for which the number of probe points having the respective trajectory ID unambiguously matched thereto is greater. Thus, the probe point having the respective trajectory ID that was associated with the ambiguous link tuple is matched to the branch of the road network, such as maybe defined by the link of the ambiguous link tuple, for which a greater number of probe points having the same respective trajectory ID are matched thereto. By way of an example, in an instance in which twenty probe points having a respective trajectory ID are unambiguously matched to the first branch while two probe points having the same trajectory ID are unambiguously matched to the second branch, the apparatus, such as the processor, of this example embodiment is configured to match the probe point having the respective trajectory ID that was associated with the ambiguous link tuple to the first branch. However, in an instance in which the same number of probe points having the respective trajectory ID are matched to both the first branch and to the second branch, the apparatus, such as the processor, of this example embodiment may cause the probe point having the respective trajectory ID to remain associated with the ambiguous link tuple since the probe point cannot be associated with either of the links of the ambiguous link tuple with sufficient confidence.

By way of example and in comparison to FIG. 4 in which the plurality of probe points associated with the ambiguous link tuple 50 were depicted so as to have a black color, FIG. 6 depicts the probe points that were previously associated with the ambiguous link region but that have now been associated with either the first branch or the second branch. In this regard, the probe points that are matched to the first branch are, in turn, associated with the link of the ambiguous link tuple that corresponds to the first branch, such as being a part of the first branch or being part of the same roadway upstream of the first branch. Similarly, the probe points that are matched to the second branch are associated with the link of the ambiguous link tuple that corresponds to the second branch, such as being a part of the second branch or being part of the same roadway upstream of the second branch. In relation to FIG. 6, the probe points shown to have a red color are associated with the second branch 54, that is, the ramp, while the probe point shown to have a yellow color are associated with the first branch 52, namely, the highway that continues onward beyond the ramp.

In an example embodiment, the apparatus 20 also includes means, such as the processor 22 or the like, for determining a confidence value associated with the match of the probe point having the respective trajectory ID to the respective one of the first branch 52 or the second branch 54. See block 38 of FIG. 3. Although the confidence value may be determined in various manners, the confidence value of an example embodiment is determined based upon a ratio of the number of probe points having the respective trajectory ID that are unambiguously matched to the first branch and the number of probe points having the respective trajectory ID that are unambiguously matched to the second branch. With reference to the foregoing example in which twenty probe points having the respective trajectory ID are map matched to the first branch and two probe points having the same respective trajectory ID are map matched to the second branch, the ratio may be defined as 20:2. In an example embodiment, matches of the probe points that were associated with the ambiguous link tuple for which a confidence value exceeds a predetermined threshold may be maintained, while probe points that were associated with the ambiguous link tuple for which the confidence value associated with the match to a respective one of the first branch or the second branch fails to satisfy the predetermined threshold may remain matched, not with a respective one of the first branch or the second branch, but with the ambiguous link tuple.

As described above, a method, apparatus and computer program product are provided to match probe points to road segments utilizing a trajectory identifier. As such, probe points in ambiguous locations within a road network may be more accurately matched to road segments with a greater level of confidence. In order to match the probe points to road segments in an efficient manner, many of the probe points may initially be matched to respective links that comprise the road segments with a map-centric map matching technique prior to matching the probe points from an ambiguous link tuple to road segments utilizing a trajectory identifier in accordance with an example embodiment of the present invention. In order to further increase the efficiency, the probe points at ambiguous locations within the road network may be accurately mapped to respective road segments by analyzing the probe points already matched to a limited number of the road segments that are proximate to the ambiguous locations in a single traversal along the road segments.

FIGS. 3 and 5 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 20 employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
for a probe point having a respective trajectory identifier (ID) that identifies probe points collected by a device at least for a period of time and associated with an ambiguous link tuple comprised of two or more links of a road network to which the probe point is matched, identifying each probe point having the respective trajectory ID that is unambiguously matched to one of a first branch or a second branch that extend away from the ambiguous link tuple;
separately determining a number of probe points having the respective trajectory ID that are unambiguously matched to the first branch and that are unambiguously matched to the second branch; and
matching the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

2. A method according to claim 1 wherein matching the probe point comprises matching the probe point having the respective trajectory ID that was associated with the ambiguous link tuple to the respective one of the first branch or the second branch for which the number of probe points having the respective trajectory ID unambiguously matched thereto exceeds the number of probe points having the respective trajectory ID that are unambiguously matched to the other one of the first branch or the second branch by at least a predefined amount.

3. A method according to claim 2 further comprising causing the probe point having the respective trajectory ID to remain associated with the ambiguous link tuple in an instance in which the number of probe points having the respective trajectory ID that are unambiguously matched to the first branch and that are unambiguously matched to the second branch differ by less than the predefined amount.

4. A method according to claim 1 wherein a plurality of probe points having respective trajectory IDs are associated with the ambiguous link tuple, and wherein identifying each probe point comprises identifying each probe point having any one of the respective trajectory IDs of the probe points associated with the ambiguous link tuple that are unambiguously matched to one of the first branch or the second branch during a single traversal of the first branch and the second branch.

5. A method according to claim 1 further comprising determining a confidence value associated with the match of the probe point having the respective trajectory ID to a respective one of the first branch or the second branch based upon a ratio of a number of probe points having the respective trajectory ID that are unambiguously matched to the first branch and to the second branch.

6. A method according to claim 1 further comprising map matching a plurality of probe points to respective links, wherein map matching comprises identifying the probe point associated with the ambiguous link tuple.

7. A method according to claim 1 wherein identifying each probe point comprises identifying each probe point having the respective trajectory ID that is unambiguously matched to one of the first and second branches along a same predefined length of the first and second branches.

8. A method according to claim 1 wherein the first branch splits into at least two sub-branches, and wherein identifying each probe point comprises identifying each probe point having the respective trajectory ID that is unambiguously matched to one of the at least two sub-branches.

9. An apparatus comprising at least one processor and at least one memory storing computer program code, wherein the at least one memory and stored computer program code are configured, with the at least one processor, to cause the apparatus to at least:
for a probe point having a respective trajectory identifier (ID) that identifies probe points collected by a device at least for a period of time and associated with an ambiguous link tuple comprised of two or more links of a road network to which the probe point is matched, identify each probe point having the respective trajectory ID that is unambiguously matched to one of a first branch or a second branch that extend away from the ambiguous link tuple;
separately determine a number of probe points having the respective trajectory ID that are unambiguously matched to the first branch and that are unambiguously matched to the second branch; and
match the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

10. An apparatus according to claim 9 wherein the at least one memory and stored computer program code are configured, with the at least one processor, to cause the apparatus to match the probe point by matching the probe point having the respective trajectory ID that was associated with the ambiguous link tuple to the respective one of the first branch or the second branch for which the number of probe points having the respective trajectory ID unambiguously matched thereto exceeds the number of probe points having the respective trajectory ID that are unambiguously matched to the other one of the first branch or the second branch by at least a predefined amount.

11. An apparatus according to claim 10 wherein the at least one memory and stored computer program code are further configured, with the at least one processor, to cause the apparatus to cause the probe point having the respective trajectory ID to remain associated with the ambiguous link tuple in an instance in which the number of probe points having the respective trajectory ID that are unambiguously matched to the first branch and that are unambiguously matched to the second branch differ by less than the predefined amount.

12. An apparatus according to claim 9 wherein a plurality of probe points having respective trajectory IDs are associated with the ambiguous link tuple, and wherein the at least one memory and stored computer program code are configured, with the at least one processor, to cause the apparatus to identify each probe point by identifying each probe point having any one of the respective trajectory IDs of the probe points associated with the ambiguous link tuple that are unambiguously matched to one of the first branch or the second branch during a single traversal of the first branch and the second branch.

13. An apparatus according to claim 9 wherein the at least one memory and stored computer program code are further configured, with the at least one processor, to cause the apparatus to determine a confidence value associated with the match of the probe point having the respective trajectory ID to a respective one of the first branch or the second branch based upon a ratio of a number of probe points having the respective trajectory ID that are unambiguously matched to the first branch and to the second branch.

14. An apparatus according to claim 9 wherein the at least one memory and stored computer program code are further configured, with the at least one processor, to cause the apparatus to map match a plurality of probe points to respective links, and wherein the at least one memory and stored computer program code are configured, with the at least one processor, to cause the apparatus to map match by identifying the probe point associated with the ambiguous link tuple.

15. A computer program product comprising at least one non-transitory computer-readable storage medium having computer-readable program instructions stored therein, the computer-readable program instructions comprising:
for a probe point having a respective trajectory identifier (ID) that identifies probe points collected by a device at least for a period of time and associated with an ambiguous link tuple comprised of two or more links of a road network to which the probe point is matched, program instructions configured to identify each probe point having the respective trajectory ID that is unambiguously matched to one of a first branch or a second branch that extend away from the ambiguous link tuple;

program instructions configured to separately determine a number of probe points having the respective trajectory ID that are unambiguously matched to the first branch and that are unambiguously matched to the second branch; and program instructions configured to match the probe point having the respective trajectory ID that was associated with the ambiguous link tuple to a respective one of the first branch or the second branch based upon the number of probe points having the respective trajectory ID that are unambiguously matched to the first branch and that are unambiguously matched to the second branch.

16. A computer program product according to claim 15 wherein the program instructions configured to match the probe point comprise program instructions configured to match the probe point having the respective trajectory ID that was associated with the ambiguous link tuple to the respective one of the first branch or the second branch for which the number of probe points having the respective trajectory ID unambiguously matched thereto exceeds the number of probe points having the respective trajectory ID that are unambiguously matched to the other one of the first branch or the second branch by at least a predefined amount.

17. A computer program product according to claim 16 wherein the computer-readable program instructions further comprise program instructions configured to cause the probe point having the respective trajectory ID to remain associated with the ambiguous link tuple in an instance in which the number of probe points having the respective trajectory ID that are unambiguously matched to the first branch and that are unambiguously matched to the second branch differ by less than the predefined amount.

18. A computer program product according to claim 15 wherein a plurality of probe points having respective trajectory IDs are associated with the ambiguous link tuple, and wherein the program instructions configured to identify each probe point comprise program instructions configured to identify each probe point having any one of the respective trajectory IDs of the probe points associated with the ambiguous link tuple that are unambiguously matched to one of the first branch or the second branch during a single traversal of the first branch and the second branch.

19. A computer program product according to claim 15 wherein the computer-readable program instructions further comprise program instructions configured to determine a confidence value associated with the match of the probe point having the respective trajectory ID to a respective one of the first branch or the second branch based upon a ratio of a number of probe points having the respective trajectory ID that are unambiguously matched to the first branch and to the second branch.

20. A computer program product according to claim 15 wherein the computer-readable program instructions further comprise program instructions configured to map match a plurality of probe points to respective links, wherein the program instructions configured to map match comprise program instructions configured to identify the probe point associated with the ambiguous link tuple.

* * * * *